(12) United States Patent
Kanskar

(10) Patent No.: US 9,865,984 B2
(45) Date of Patent: Jan. 9, 2018

(54) FIBER PUMP COMBINER

(71) Applicant: nLIGHT, Inc., Vancouver, WA (US)

(72) Inventor: Manoj Kanskar, Portland, OR (US)

(73) Assignee: nLight, Inc., Vancouver, WA (US)

( * ) Notice: Subject to any disclaimer, the term of this patent is extended or adjusted under 35 U.S.C. 154(b) by 0 days.

(21) Appl. No.: 15/391,050

(22) Filed: Dec. 27, 2016

(65) Prior Publication Data

US 2017/0194760 A1 Jul. 6, 2017

Related U.S. Application Data

(60) Provisional application No. 62/274,060, filed on Dec. 31, 2015.

(51) Int. Cl.
G02B 6/04 (2006.01)
G02B 6/28 (2006.01)
H01S 3/094 (2006.01)
H01S 3/0941 (2006.01)

(52) U.S. Cl.
CPC .......... *H01S 3/094053* (2013.01); *G02B 6/04* (2013.01); *G02B 6/2821* (2013.01); *H01S 3/0941* (2013.01); *H01S 3/09408* (2013.01); *H01S 3/094007* (2013.01)

(58) Field of Classification Search
CPC .... G02B 6/04; G02B 6/2821; H01S 3/094053
See application file for complete search history.

(56) References Cited

U.S. PATENT DOCUMENTS

| 5,999,673 | A | 12/1999 | Valentin et al. |
| 6,385,371 | B1 | 5/2002 | Li |
| 7,933,479 | B2 | 4/2011 | Gonthier et al. |
| 2005/0105854 | A1 | 5/2005 | Dong et al. |
| 2008/0050069 | A1 | 2/2008 | Skovgaard et al. |
| 2008/0170823 | A1 | 7/2008 | Gonthier |
| 2009/0067793 | A1 | 3/2009 | Bennett et al. |
| 2013/0163930 | A1 | 6/2013 | Jian |

FOREIGN PATENT DOCUMENTS

| CA | 2104239 A1 | 2/1994 |
| CA | 2787699 A1 | 7/2011 |
| WO | 2008083482 A1 | 7/2008 |

OTHER PUBLICATIONS

International Search Report and Written Opinion for PCT/US16/68673, dated Apr. 28, 2017, 12 pages.

*Primary Examiner* — Jerry Rahll

(57) ABSTRACT

An optical fiber combiner comprising a coupling device having an input surface area, and you $A_{in}$, and an output surface area, $A_{out}$, wherein the input surface area $A_{in}$ is greater than the output surface area $A_{out}$, and a plurality of optical fibers each having an input surface and an output surface, wherein the output surfaces of the plurality of optical fibers are coupled to the coupling device, wherein the coupling device combines optical power emitted by the plurality of optical fibers.

12 Claims, 14 Drawing Sheets

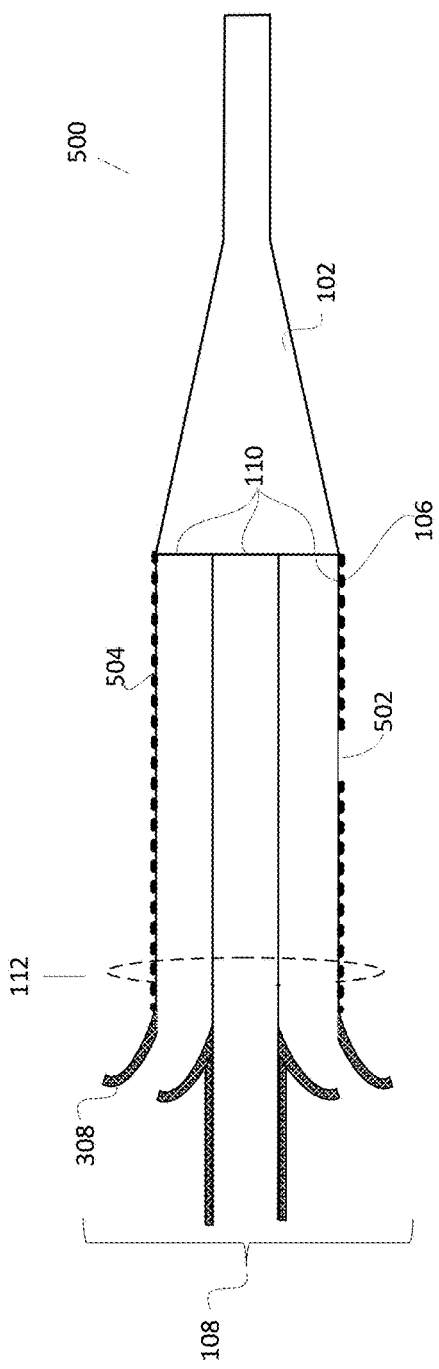

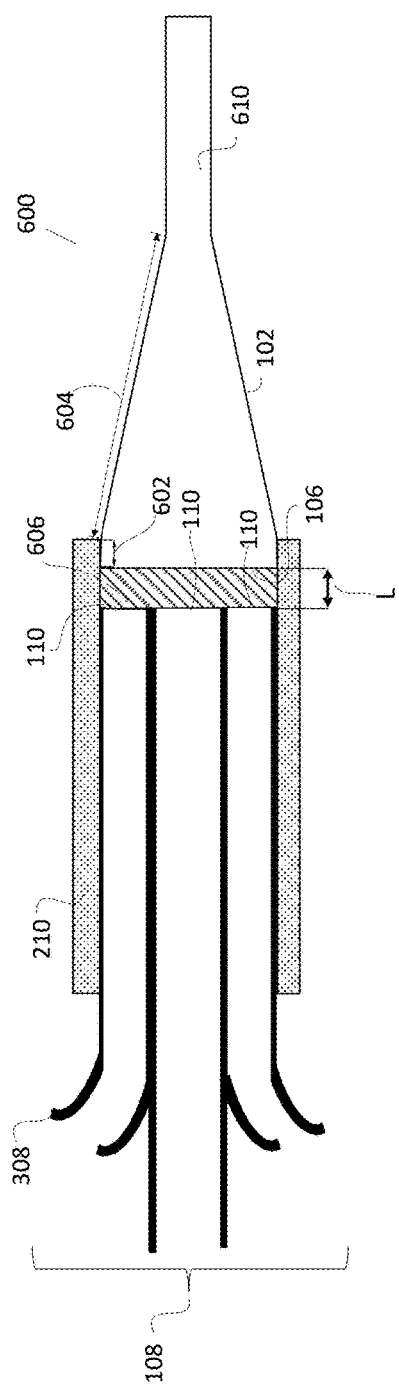
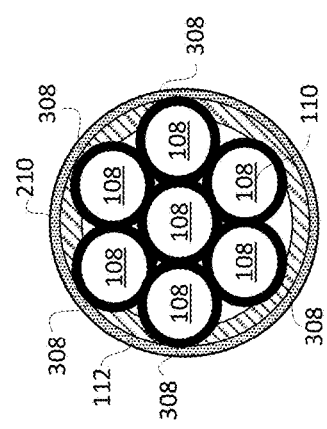
FIG. 6A
FIG. 6B

FIBER PUMP COMBINER

TECHNICAL FIELD

The disclosure relates to high power fiber laser systems. Particularly, the disclosure relates to a high power fiber system configured to combine a plurality of optical fibers into a single output fiber.

BACKGROUND

High power semiconductor lasers are used to pump cladding pumped fiber lasers. Fiber lasers are capable of producing output power in the multiple kW range and are used in a variety of applications that require high output power such as cutting, welding, material processing (e.g., marking, engraving, and cutting) and directed energy. Achieving the power levels required for these applications is often accomplished by combining the fiber-coupled outputs of multiple lower power diode modules to pump active fibers.

When combining diode pumped fibers it is often convenient to perform the beam combination of the coupled fibers with a fiber based beam combiner that couples a plurality of optical fibers to a single output fiber. Conventionally, combining multiple fibers to achieve higher power can either reduce beam efficiency or beam quality. High power (kilowatt-class) fiber pump, pump-signal and signal combiners are vulnerable to small imperfections and losses which have significant impact on reliability.

In general, a process of fabricating a high power combiner includes significant physical manipulation of the optical fibers in the bundle. For example, often optical output fibers of the bundle are fused, twisted and tapered into an hourglass shape, and cleaved at the waist. Conventionally, tapering of the bundle of fibers requires the cross-sectional area of the untapered fiber bundle to be narrowed down to a cross-sectional area of the single output fiber. Once the fiber bundle is cleaved, the output end of the tapered fiber bundle is spliced (or otherwise coupled) onto an output fiber. All of this physical manipulation may result in structural defects such as micro-bends in the fibers or cladding which can introduce loss and/or degradation in beam quality or efficiency. Further, due to the twisting of optical fibers needed to achieve high coupling efficiency they are difficult to handle. What is needed is a method of reducing the amount of physical manipulation of the optical fibers associated with the fabrication of optical fiber combiners.

SUMMARY

Disclosed herein is an optical fiber combiner comprising, a coupling device having an input surface area, $A_{in}$, and an output surface area, $A_{out}$, wherein the input surface area $A_{in}$ is greater than the output surface area $A_{out}$ and wherein a body of the coupling device comprises a gradual taper from the input surface area to the output surface area, and a plurality of optical fibers each having an input surface and an output surface, wherein the output surfaces of the plurality of optical fibers are optically coupled to the coupling device, wherein the coupling device combines optical power emitted by the plurality of optical fibers. The optical fiber combiner may also include a hollow structure configured to encase the plurality of optical fibers and to secure the plurality of optical fibers in place for coupling to the coupling device. In some examples, the hollow structure is a capillary having an inner diameter substantially equal to an outer diameter of the input surface area of the coupling device. In some examples, wherein the hollow structure is closely-fit around the output surface area of the coupling device and the optical fibers. The output surfaces of the plurality of optical fibers may be substantially in contact with the input surface area of the coupling device. There may be a gap between the output surfaces of the plurality of optical fibers and the input surface area of the coupling device, wherein the plurality of optical fibers are held in place by the hollow structure. The hollow structure may have a shape substantially matching the shape of the input surface of the coupling device, wherein the shape is circular, elliptical, rectangular, polyhedral, or any combinations thereof. The hollow structure may comprise a material configured to constrict around the plurality of optical fibers and the coupling device in response to mechanical means, pressure change, exposure to a chemical, or a chemical catalyst, or any combinations thereof.

The output ends of the optical fibers can be coated with an antireflective coating. In some examples, the hollow structure has a lower index of refraction than the index of refraction of the plurality of input optical fibers. The output end of the optical fibers can be coupled to the input surface of the coupling device by plasma heating, $CO_2$ laser, resistive heating, fusion splicing or epoxy or any combinations thereof.

Further disclosed herein is a method for fabricating an optical fiber combiner comprising, exposing an output end of a silica rod to an etchant, gradually exposing a length of the silica rod lengthwise to the etchant over a period of time, ending the etching at the input end to etch a gradual taper to into the length of the silica rod by gradually exposing the length of the silica rod to the etchant over the period of time, wherein the etching begins by exposing the output end to the etchant first and then gradually exposing the entire length of the silica rod ending the etching with the input end causing the input end to have a greater surface area $A_{in}$ than the surface area $A_{out}$ of the output end. The method may also include gradually exposing the silica rod to the etchant at a constant rate for a fixed period of time. In some examples, the fixed period of time is determined by an output diameter of the silica rod. The method may also include polishing the input end of the silica rod. The etching can be wet etching. The method may further include, coating the input surface with an antireflective coating for free-space coupling and/or coating the input surface with a surface treatment configured to enable fusion splicing of input fibers.

Further disclosed herein is a method for fabricating an optical fiber combiner, comprising, applying heat to a silica rod to fabricate a gradual taper in the silica rod over a length of the silica rod, wherein the silica rod has an input end and an output end, wherein the silica rod is tapered such that the input end has a greater surface area $A_{in}$ than a surface area $A_{out}$ of the output end, treating the input end of the silica rod with an anti-reflective coating and forming an output waveguide onto the output end of the silica rod. In an example, the output waveguide further comprises splicing the waveguide onto the output end of the silica rod.

Also disclosed herein is a method for fabricating an optical fiber combiner comprising, disposing a first end of a hollow structure around an input surface of a coupler, the coupler comprising a silica rod having a tapered outer surface and an output waveguide, wherein the coupler has a higher index of refraction compared to the hollow structure, threading a plurality of optical fibers from a second end of the hollow structure through a length of an inner aperture of the hollow structure, coupling the plurality of optical fibers with the input surface of the coupler and collapsing the hollow structure onto the coupler and the plurality of optical fibers. In an example, an outer surface of the hollow structure is textured to remove high numerical aperture light transmitted into the optical fibers or the hollow structure or a combination thereof. The hollow structure may have a higher index of refraction compared to an index of refraction of input fiber cladding. In an example, the hollow structure may have an index of refraction that only strips light having a predetermined numerical aperture that is not desirable to be coupled into the coupler. The hollow structure may have an asymmetric shape and is configured to scramble the mode.

The foregoing and other objects, features, and advantages will become more apparent from the following detailed description, which proceeds with reference to the accompanying figures which may not be drawn to scale.

BRIEF DESCRIPTION OF THE DRAWINGS

The accompanying drawings, wherein like reference numerals represent like elements, are incorporated in and constitute a part of this specification and, together with the description, explain the advantages and principles of the presently disclosed technology. In the drawings.

FIG. 5A is a cutaway view illustrating an example of an optical fiber combiner assembly;

FIG. 5B is a cross-sectional view of a bundle of optical fibers.

FIG. 5C is a cross-sectional view of a bundle of optical fibers having a coating on outward facing surfaces of the optical fibers;

FIG. 6A is a cutaway view illustrating an example of an optical fiber combiner assembly;

FIG. 6B is a sectional view of an example of a bundle of optical fibers within a hollow structure having retained cladding;

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

Figure 1:
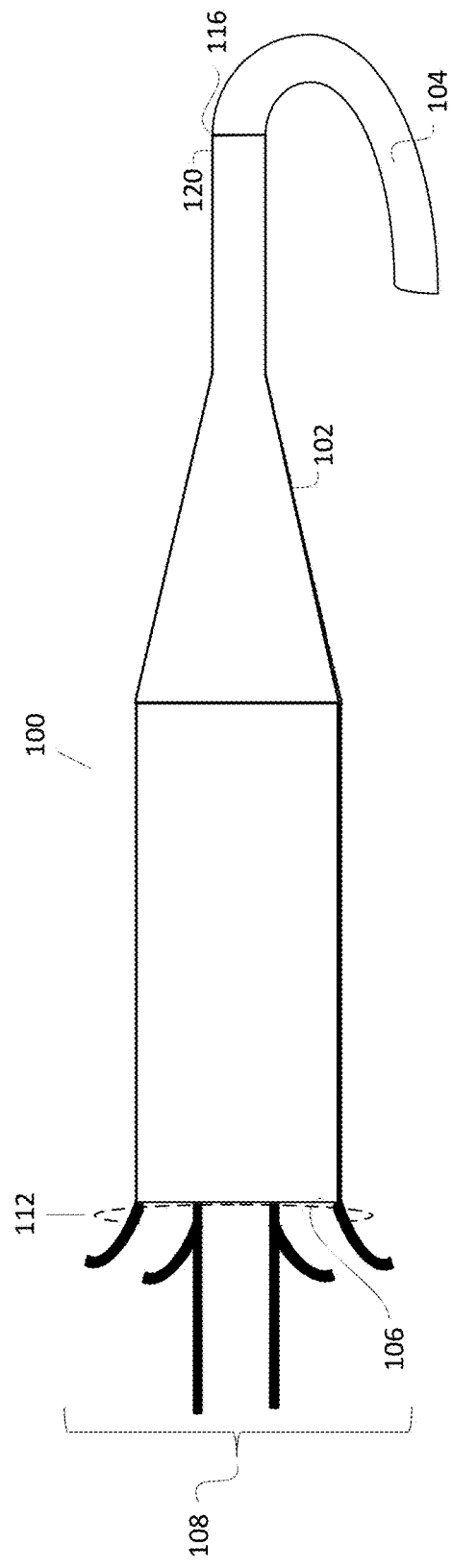
FIG. 1 illustrates an example of an optical fiber combiner assembly.

FIG. 1 illustrates an example of an optical fiber combiner assembly 100. In an example, optical fiber combiner assembly 100 comprises a coupler 102 that is configured to taper to an output waveguide 104. The coupler 102 couples to waveguide 104 at an output surface 120. An input surface 106 of coupler 102 is positioned to receive optical energy emitted from one or more input optical fibers 108. Input surface area of coupler 102 has an input surface area of $A_{in}$ and a numerical aperture $NA_{in}$. Output surface 120 has an output surface area $A_{out}$ and a numerical aperture $NA_{out}$. In an example, input surface area $A_{in}$ is greater than the output surface area $A_{out}$.

Assembly 100 can form a part of a laser system wherein optical energy is coupled into optical fibers 108 by diode pumps and/or other sources. Optical fibers 108 form a bundle 112. Optical fibers 108 can be any size or shape as long as the individual optical fibers 108 or the bundle 112 of optical fibers 108 does not violate the brightness conservation rule for the sum of the input fibers, $$\left(\text{i.e.,}\left(\frac{NA_{in}}{NA_{out}}\right)^2 \le \frac{A_{out}}{\sum A_{in}}\right)$$

where $A_{in}$ and $NA_{in}$ are input fiber cross-sectional area and the numerical aperture of the beam respectively and $A_{out}$ and $NA_{out}$ are output cross-sectional area of the coupler and its numerical aperture respectively. Coupler 102 combines power from bundle 112 of N-input optical fibers 108 into output waveguide 104. Bundle 112 may comprise any number N of input optical fibers 108. The combined optical power is directed to output surface 120 where power may be further coupled into a single output fiber 104 for emission of optical power at an output surface of the output fiber. Rather than tapering the optical fibers themselves, optical fibers 108 may be coupled to coupler 102 that is itself tapered which reduces the amount of physical manipulation of the optical fibers 108 associated with fabrication of conventional optical fiber combiners. The coupler 102 may be tapered from a diameter sufficient for coupling optical fiber bundle 112 at the input surface 106 down to a diameter at the output end 120 that is the same, similar or even smaller compared to the diameter of the input end 116 of the single output fiber 104.

Optical fibers 108 may be coupled to coupler 102 via a variety of methods including butt-coupling or by fusion. In an example, optical fibers 108 and input surface 106 of coupler 102 may be in contact or at least as closely in physical contact as possible. In some embodiments, gaps between optical fibers 108 and input surface 106 may arise due to imperfections in an angle of alignment between optical fibers 108 and input surface 106. It may be desirable to minimize imperfections in the angle of alignment between optical fibers 108 and input surface 106 to preserve (i.e., not deteriorate) beam parameter product (BPP).

Figure 2:
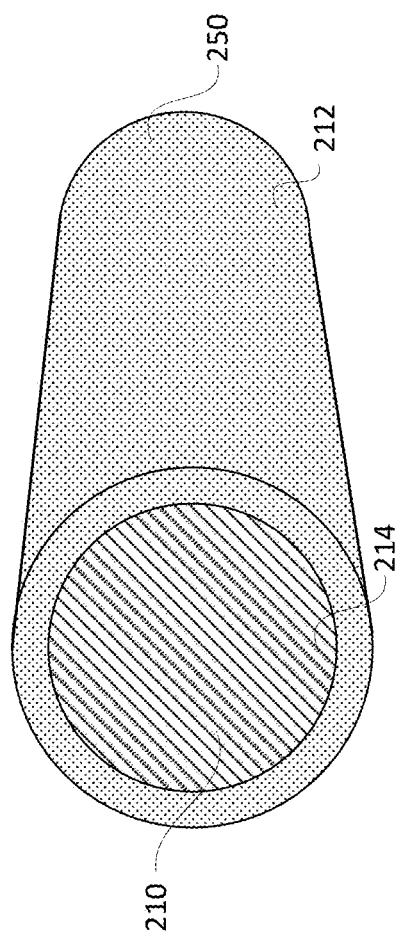
FIG. 2 illustrates an example of a hollow structure configured to secure a bundle of one or more optical fibers in place.

FIG. 2 illustrates an example of a hollow structure 210 configured to secure bundle 112 of one or more optical fibers 108 in place in a combiner assembly 100. Hollow structure 210 may be any of a variety of shapes, for example, a circle, rectangle, ellipse, polyhedron, an irregular shape or the like or any combinations thereof. Hollow structure 210 may comprise sidewalls 212 and a cavity 214 into which one or more optical fibers 108 may be disposed. Hollow structure 210 may comprise a variety of materials including materials such as glass, fused silica, polymer, doped polymer, fluorosilicate, silica doped with one or more materials known to those of skill in the art to be of judicious choice of index of refraction, or the like or any combination thereof. Hollow structure 210 may comprise a material configured to constrict around the plurality of optical fibers and the coupling device in response to application of heat, mechanical means, pressure change or exposure to a chemical, such as a chemical catalyst.

In an example where input fibers 108 retain cladding in the bundle 112, the hollow structure 210 may be of any of a variety of shapes and high index material compared to the cladding 308 (see FIG. 3) of the input fibers 108. This will help to strip any higher NA light along 210 region before coupling into coupler 102. Yet, in another example, hollow structure 210 may be designed with a judicious choice of index of refraction to strip any higher NA light that cannot be coupled into the coupler 102 and may cause detrimental effects in the combiner 102 assembly. Outer surface 250 of hollow structure 210 may have any of a variety of surface textures. For example, the texture may be smooth or may be roughened or textured in order to strip out unwanted higher NA light.

Figure 3:
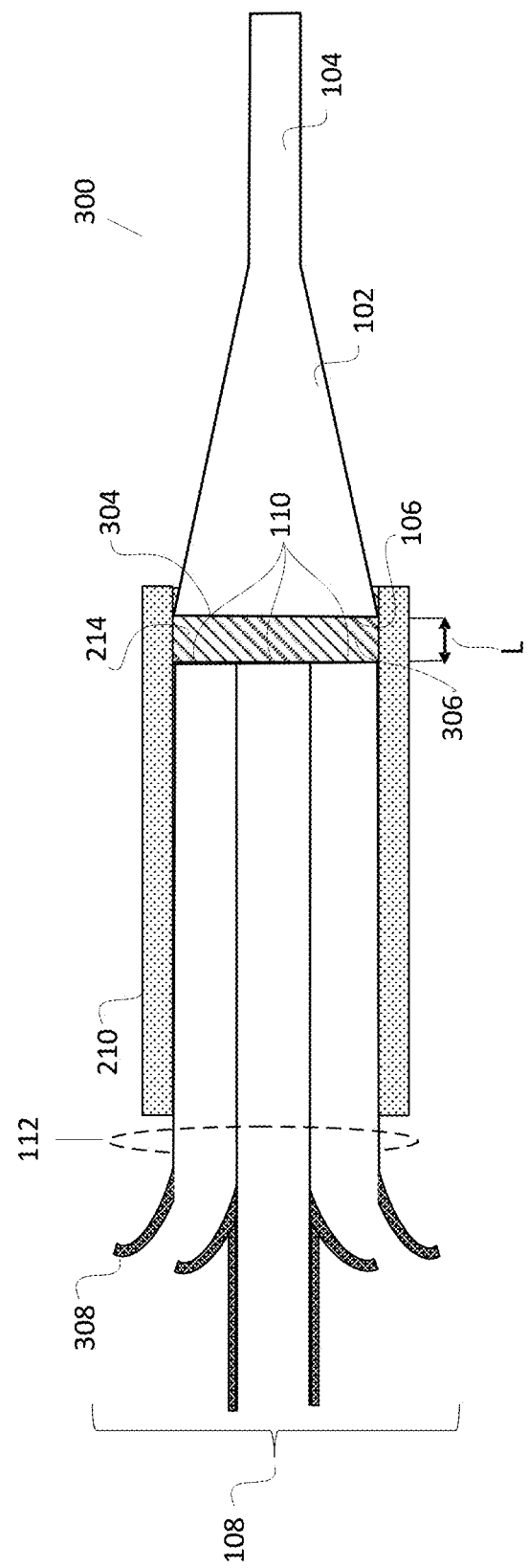
FIG. 3 is a cutaway view illustrating an example of an optical fiber combiner assembly.

FIG. 3 is a cutaway view illustrating an example of an optical fiber combiner assembly 300. In an example, optical fibers 108 are each stripped of cladding 308 and buffer or protective coating. Fiber bundle 112 and coupler 102 may be positioned within hollow structure 210. Hollow structure 210 may be a round capillary. An inner diameter of hollow structure 210 may be the same shape and substantially equal to or slightly larger than an outer diameter of coupler 102 such that coupler 102 can be compactly disposed in cavity 214 of hollow structure 210. Similarly, the inner diameter of hollow structure 210 may be the same shape and substantially equal to or slightly larger than an outer diameter of bundle 112 such that coupler 102 can be securely disposed in cavity 214 of hollow structure 210. Thus, hollow structure 210 may secure optical fibers 108 and coupler 102 in place. Input surface 106 may be disposed a distance L, from one or more output surfaces 110 of one or more optical fibers 108. In some examples, optical fibers 108 may be positioned within hollow structure 210 without stripping cladding 308.

In an example, output surfaces 110 of optical fibers 108 and input surface 106 of coupler 102 may be separated by a gap 306. Output surfaces 110 of optical fibers 108 and/or input surface 106 of coupler 102 may be coated with an antireflection coating to facilitate low loss transmission of optical energy across gap 306. In an example, hollow structure 210 may have a lower index of refraction compared to an index of refraction of one or more optical fibers 108 or higher than the index of refraction of the cladding 308 of input fibers 108.

In an example, hollow structure 210 may be fitted over an outer surface of coupler 102. Such a fitting may be tight and may require a certain amount of force to mate coupler 102 within aperture 214. Likewise, bundle 112 may be threaded through aperture 214 to achieve a close-fitting of bundle 112 within hollow structure 210.

Figure 4A:
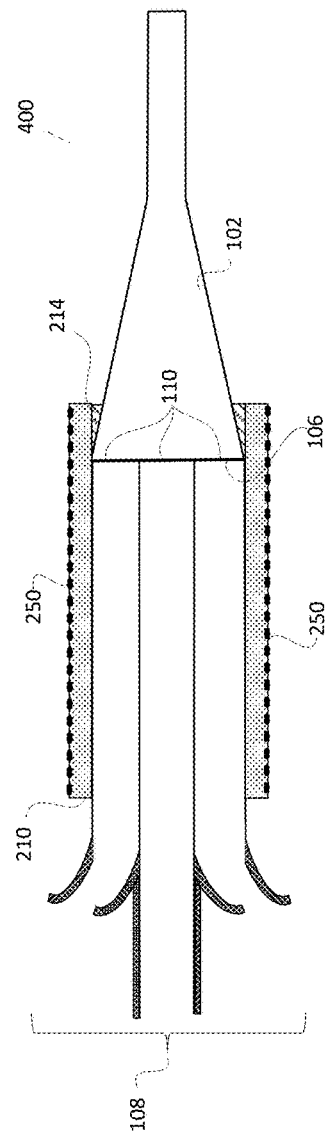
FIG. 4A is a cutaway view illustrating an example of an optical fiber combiner assembly.

FIG. 4A is a cutaway view illustrating an example of an optical fiber combiner assembly 400. In an example, optical fibers 108 and coupler 102 may be positioned within hollow structure 210. Output surfaces 110 of optical fibers 108 and input surface 106 of coupler 102 may be in physical contact. Contact between output surfaces 110 and input surface 106 may be made by a variety of methods such as by fusion splicing and/or van der Waals bonding. A variety of methods may be used to fusion splice the output surfaces 110 and input surface 106 such as using a laser, a flame, an electric arc, and/or plasma or the like or a combination thereof.

In an example, unwanted higher NA light may get coupled into 210 and dissipate from the output end. The outer surface 250 of hollow structure 210 may be corrugated, textured or otherwise configured to scatter the higher NA light coupled into hollow structure 210 along the length as well as the end to distribute the dissipation. Hollow structure 210 may be fabricated to fit snuggly around coupler 102 and bundle 112. To facilitate proper alignment between optical fibers 108 and input surface 106, hollow structure 210 may be used as a self-aligning guide for coupler 102 and/or optical fibers 108 to assist in aligning output surfaces 110 and input 106 surfaces. Such a guide can minimize imperfections in an angle of alignment between optical fibers 108 and coupler 102. Hollow structure 210 may be positioned over an outer diameter of bundle 112 and an outer diameter of coupler 102 such that coupler 102 is tightly disposed within central aperture 214 of hollow structure 210. Optical fibers 108 and coupler 102 are placed within hollow structure 210 where the inner diameter of hollow structure 210 is only slightly larger than the outer diameter of either or optical fiber bundle 112 or coupler 102. Mating, positioning and/or alignment of coupler 102 and optical fibers 108 may be facilitated with tension, heat, vacuum pressure, liquid and/or index matching fluid may be used. This technique may simplify alignment, improve yield and prevent input optical fibers from going astray during the splicing process especially for large diameter couplers (e.g., ≥300.0 micron diameter). Hollow structure 210 may or may not be part of a final coupler assembly 400. In other words, hollow structure 210 may be removed after fibers 108 are aligned with surface 106.

Figure 4C:
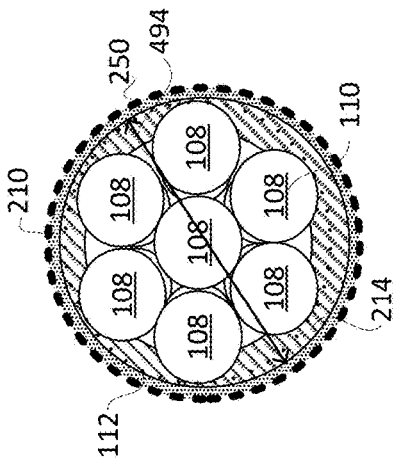
FIG. 4C is a cross-sectional view illustrating an example of a hollow structure disposed around a bundle of optical fibers.
Figure 4B:
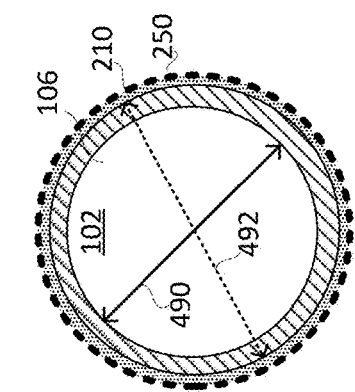
FIG. 4B is a cross-sectional view illustrating an example of a hollow structure disposed around coupler.
Figure 4D:
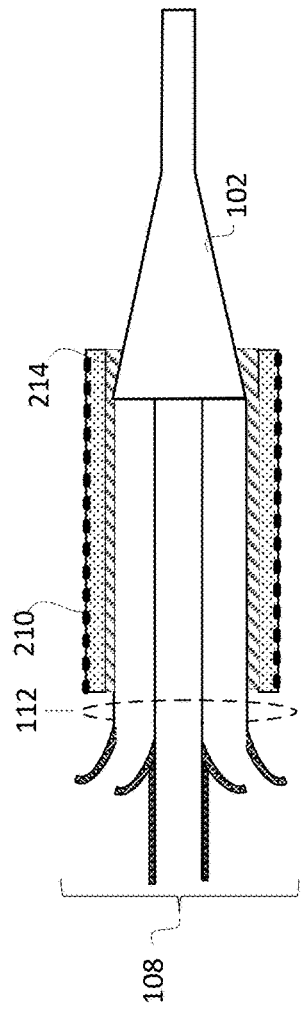
FIG. 4D is a cutaway view illustrating an example of an optical fiber combiner during assembly.

FIGS. 4B-4D illustrate various views of a combiner 400 during an example assembly process wherein hollow structure 210 is collapsed around optical fibers 108 and combiner 102.

FIG. 4B illustrates a cross-sectional view of hollow structure 210 disposed around coupler 102. In an example, during assembly of combiner 400, hollow structure 210 may be loosely disposed over coupler 102 where an inner diameter 492 of central aperture 214 is greater than an outer diameter 490 of coupler 102 to enable fitting of hollow structure 210 around coupler 102 without damaging coupler 102 or hollow structure 210. As shown in FIG. 4C, during assembly, bundle 112 of optical fibers 108 may be fed through central aperture 214 of hollow structure 210 for alignment with surface 106. Inner diameter 492 of hollow structure 210 at this point in the assembly of combiner 100 is greater than the diameter 494 of bundle 112 of optical fibers 108 to facilitate threading of optical fibers 108 through hollow structure 210. During assembly, having inner diameter 492 of hollow structure 210 greater than the diameter 494 of bundle 112 of optical fibers 108 may also facilitate alignment of surfaces 110 of optical fibers 108 with surface 106 of coupler 102.

FIG. 4D is a cutaway view of assembly 100 prior to collapsing hollow structure 210 around optical fibers 108 and coupler 102. In an example, heat can be applied to hollow structure 210 to collapse it around coupler 102 and bundle 112. Once surfaces 110 are aligned and/or coupled with surface 106. FIG. 4A illustrates an assembly 400 after collapsing hollow structure 210 around optical fibers 108 and coupler 102 assembly 400. As can be seen in FIG. 4A, there is no longer excess space around optical fiber bundle 112 after collapsing hollow structure 210. In this configuration, hollow structure 210 can provide support and protection to optical fibers of bundle 112 and coupler 102.

FIG. 5A is a cutaway view illustrating an example of an optical fiber combiner assembly 500. Optical fibers 108 may be stripped of cladding and other coatings. Output surfaces 110 of optical fibers 108 and input surface 106 of coupler 102 may be in physical contact without supporting hollow structure 210. Output surfaces 110 may be coupled to input surface 106 by any of a variety of coupling methods such as plasma heating, $CO_2$ laser annealing, resistive heating, fusion splicing or use of epoxy and/or other methods known to those skilled in the art. Bundle 112 may comprise a coating 504 on outward facing surfaces 502 of optical fibers 108. Coating 504 may be a low refractive index material including low index materials such as glass, fused silica, polymer, doped polymer, fluorosilicate, silica doped with one or more materials known to those of skill in the art to lower an index of refraction of a material, or the like or any combination thereof to strip high NA light not desirable to be coupled into the coupler 102.

FIG. 5B is a sectional view of a bundle 112 of optical fibers 108 without coating 504 on outward facing surfaces 502 of optical fibers 108. FIG. 5C is a sectional view of a bundle 112 having a coating 504 on outward facing surfaces 502 of optical fibers 108. Coating 504 may be a variety of thicknesses and may conform to the shape of the outward facing surfaces 502 of optical fibers 108. Coating 504 may fill in gaps between optical fibers and may provide support to optical fibers 108.

FIG. 6A is a cutaway view illustrating an example of an optical fiber combiner assembly 600. Fibers 108 are not stripped of an outer cladding. Rather, fibers 108 retain cladding 308 within hollow structure 210. Fibers 108 may retain cladding 308 in any of the embodiments described or contemplated herein. In FIG. 6A, output surfaces 110 of optical fibers 108 and input surface 106 of coupler 102 are not in physical contact. A gap 606 of length L may separate output surfaces 110 and input surface 106. Hollow structure 210 provides support to coupler 102 and optical fibers 108. Coupler 102 may comprise an extended input portion 602 that is not tapered. Having an untapered extended portion 602 allows stripping of higher NA light that is not desirable to be coupled into the coupler 102. A tapered portion 604 may be tapered between the extended input portion 602 and the output portion 610. Output surfaces 110 and/or output surface 106 may be coated with an antireflective coating. The antireflective coating may facilitate low loss transmission of optical energy across gap 606.

FIG. 6B is a sectional view of a bundle 112 of optical fibers 108 within hollow structure 210 having retained cladding 308.

Figure 7:
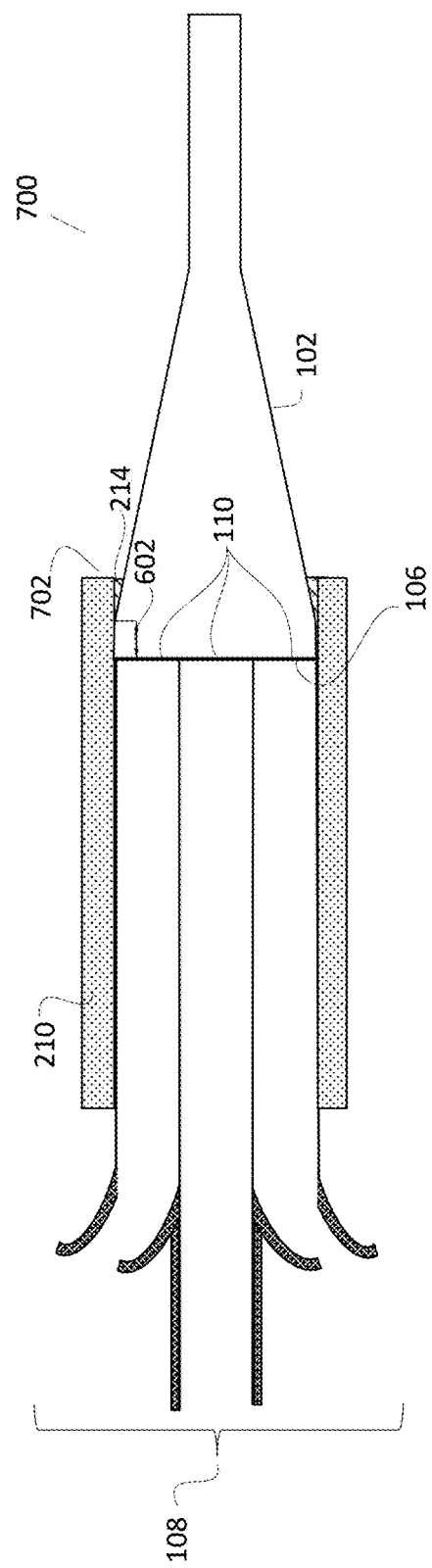
FIG. 7 is a cutaway view illustrating an example of an optical fiber combiner assembly.

FIG. 7 is a cutaway view illustrating an example of an optical fiber combiner assembly 700. Output surfaces 110 of optical fibers 108 and input surface 106 of coupler 102 are in physical contact. Hollow structure 210 provides support to coupler 102 and optical fibers 108. Coupler 102 may comprise an extended input portion 602 that is not tapered. The length of the non-tapered portion 602 may be positioned so as to not extend to an exit face 702 of aperture 214. In another example, the length of the non-tapered portion 602 may be positioned so as to extend to an exit face 702 of aperture 214.

Figure 8:
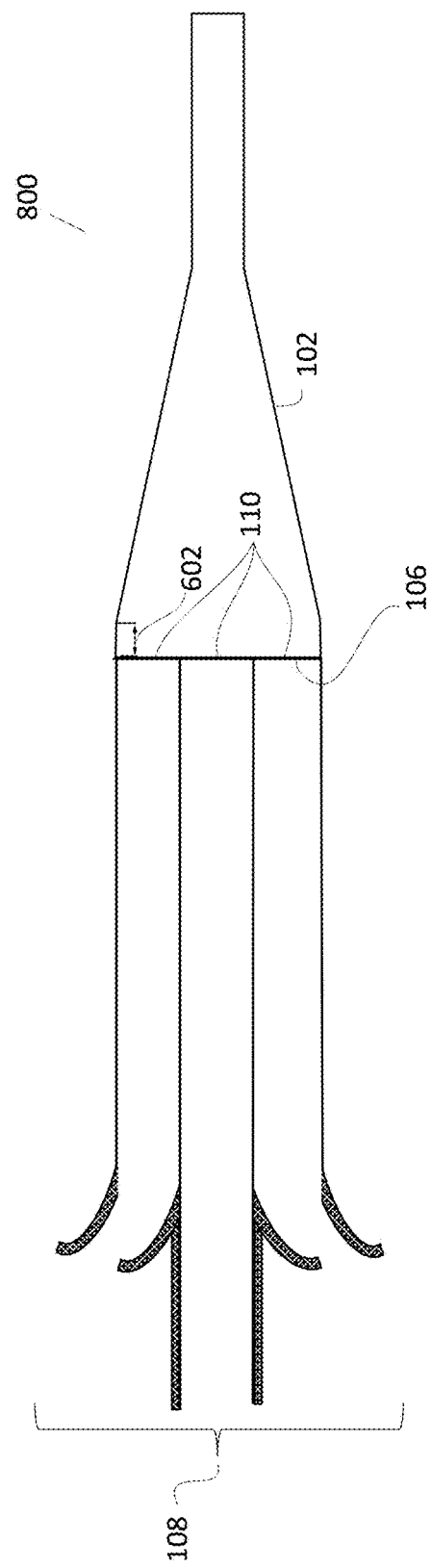
FIG. 8 is a cutaway view illustrating an example of an optical fiber combiner assembly.

FIG. 8 is a cutaway view illustrating an example of an optical fiber combiner assembly 800. Output surfaces 110 of optical fibers 108 and input surface 106 of coupler 102 may be in physical contact without supporting hollow structure 210. Output surfaces 110 may be spliced to input surface 106 by any of a variety of fusion methods such as plasma heating, $CO_2$ laser annealing, resistive heating, or use of epoxy and/or other methods known to those skilled in the art. Coupler 102 may comprise an extended input portion 602 that is not tapered.

Figure 9:
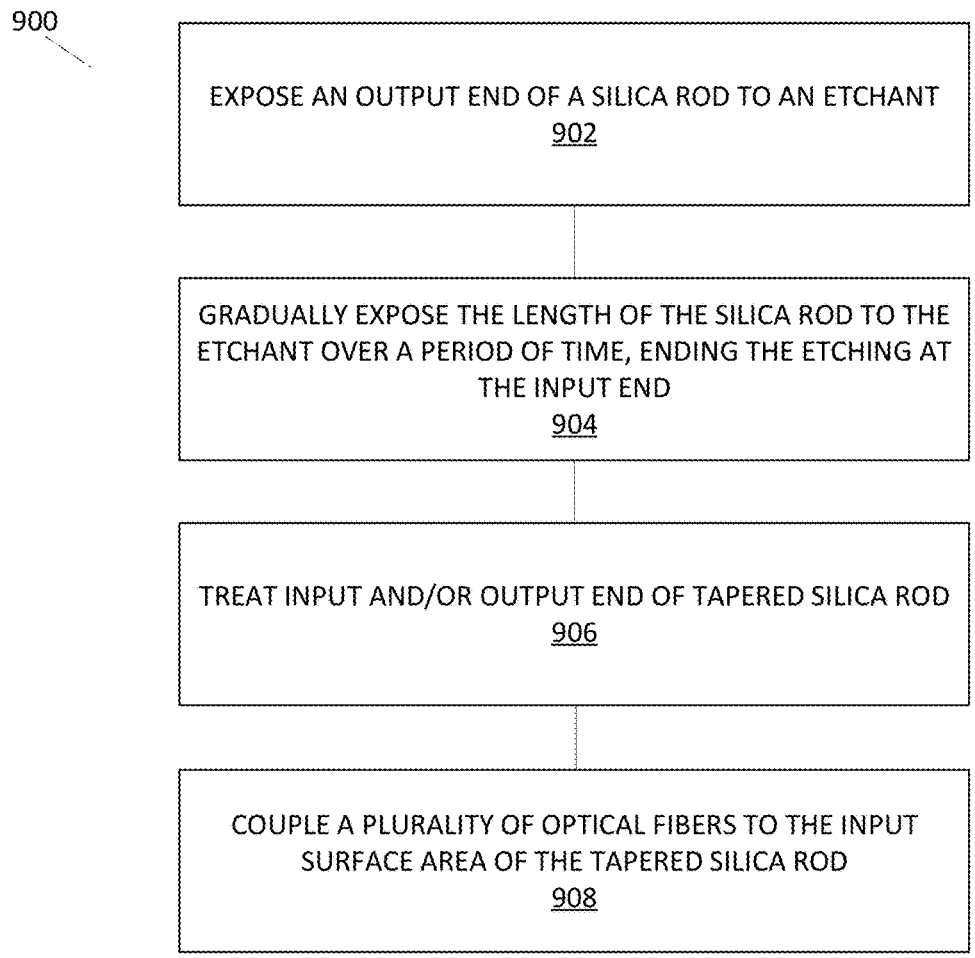
FIG. 9 illustrates an example process for fabricating an optical fiber combiner.

FIG. 9 illustrates an example process 900 for fabricating a tapered optical fiber coupler to be coupled to a plurality of optical fibers 108 in an optical fiber combiner assembly. In an example, combiner 102 can be fabricated from a length of silica rod. Coupler 102 formed from the silica rod may have an input end 106 and an output end 120. In an example, the silica rod may be wet etched by gradually exposing the silica rod to the etchant at a constant rate for a fixed period of time, wherein the fixed period of time is determined by a desired output diameter of the input end 106 and output end 120 of coupler 102. The input end 106 is to be connected to the plurality of optical fibers 108 and thus has a surface area $A_{in}$ large enough to receive the output ends 110 of N optical fibers 108 of bundle 112. After processing, the output surface area $A_{out}$ will be smaller than input surface area $A_{in}$ as the diameter of the silica rod decreases with the taper from the input surface 106 to the output surface 120. The silica rod may be substantially circular. In another example, the silica rod may be any of a variety of shapes such as elliptical, rectangular, star shaped, a polyhedron and/or an irregular shape, or the like or any combinations thereof. Further, the silica rod may comprise a variety of materials and/or may be doped with a rare earth element such as ytterbium, neodymium and/or erbium, or the like or a combination thereof.

Process 900 begins at block 902, "EXPOSE AN OUTPUT END OF A SILICA ROD TO AN ETCHANT." At block 902, fabrication of coupler 102 may begin by exposing a designated output end of the silica rod to an etchant first as the output end of the silica rod will have the smallest diameter and thus should be exposed to the etchant for the longest period of time. Process 900 proceeds to block 904, "GRADUALLY EXPOSE THE LENGTH OF THE SILICA ROD TO THE ETCHANT OVER A PERIOD OF TIME, ENDING THE ETCHING AT THE INPUT END." Such a gradual etch will cause the input end to have a greater surface area $A_{in}$ than the surface area $A_{out}$ of the output end.

Process 900 proceeds to block 906, "TREAT INPUT AND/OR OUTPUT END OF SILICA ROD." Input surface 106 may be treated for coupling with output ends 110 of the optical fibers 108. For example, the input surface 106 may be polished and/or coated with antireflective coating for free-space coupling. The texture of input surface 106 may be prepared to enable fusion splicing with optical fibers 108. In another example, input surface 106 may be coated with a surface treatment configured to promote coupling or fusion of the input surface 106 with the output surfaces 110 of the optical fibers 108.

Process 900 proceeds to block 906, "COUPLE A PLURALITY OF OPTICAL FIBERS TO THE INPUT SURFACE AREA OF THE TAPERED SILICA ROD." One or more optical fibers 108 may be coupled to input surface 106 by a variety of methods, as discussed previously.

Figure 10:
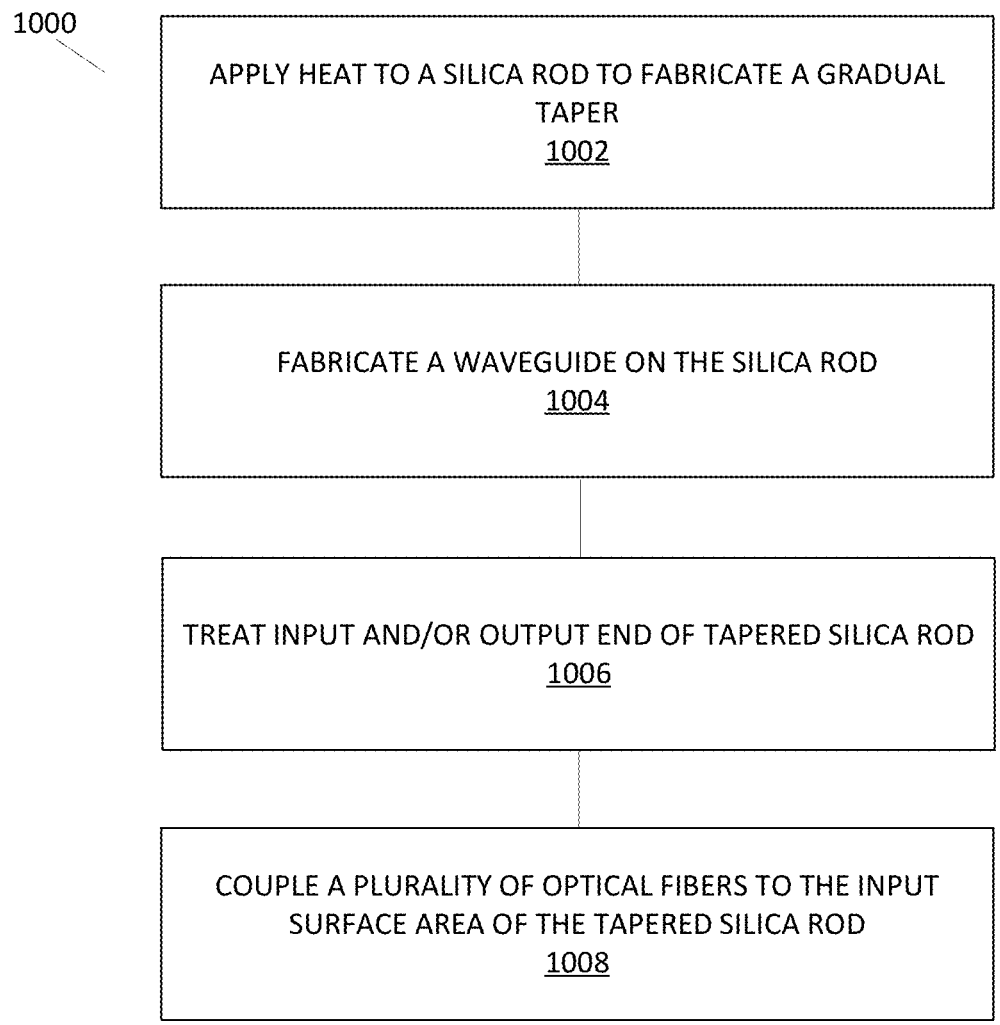
FIG. 10 illustrates an example process for fabricating an optical fiber combiner.

FIG. 10 illustrates an example process 1000 for fabricating a tapered optical fiber coupler 102 to be coupled to a plurality of optical fibers 108 to make an optical fiber combiner assembly 100. Process 1000 may begin at block 1002, "APPLY HEAT TO A SILICA ROD TO FABRICATE A GRADUAL TAPER." At block 1002 a gradual taper is fabricated into a length of a silica rod by applying heat to a silica rod. The silica rod has an input end 106 and an output end 120. Heat may be applied by a variety of methods including using a $CO_2$ laser, plasma and/or resistive heating, or the like or any combinations thereof. The silica rod can be tapered in the applied heat using mechanical means such that input end 106 will have a greater input surface area $A_{in}$ than the output surface area $A_{out}$ of the output end 120. Process 1000 may move to block 1004, "FABRICATE A WAVEGUIDE ON THE SILICA ROD." At block 1004, an output waveguide 104 is fabricated by heating and tapering an end portion of the silica rod. In another example, a waveguide 104 portion may be fabricated separately and coupled onto the end of the tapered silica rod (i.e., coupler 102). One can also first make the tapered coupler piece to which the input fibers are fused onto input surface and waveguide 104 fused to the output surface.

Process 1000 proceeds to block 1006, "TREAT INPUT AND/OR OUTPUT END OF SILICA ROD." Input surface 106 may be treated for coupling with output ends 110 of the optical fibers 108. For example, the input surface 106 may be polished and/or coated with antireflective coating for free-space coupling. The texture of input surface 106 may be prepared to enable fusion splicing with optical fibers 108. In another example, input surface 106 may be coated with a surface treatment configured to promote coupling or fusion of the input surface 106 with the output surfaces 110 of the optical fibers 108.

Process 1000 may move to block 1008, "COUPLE A PLURALITY OF OPTICAL FIBERS TO THE INPUT SURFACE AREA OF THE TAPERED SILICA ROD." One or more optical fibers 108 may be coupled to input surface 106 by a variety of methods, as discussed previously.

Figure 11:
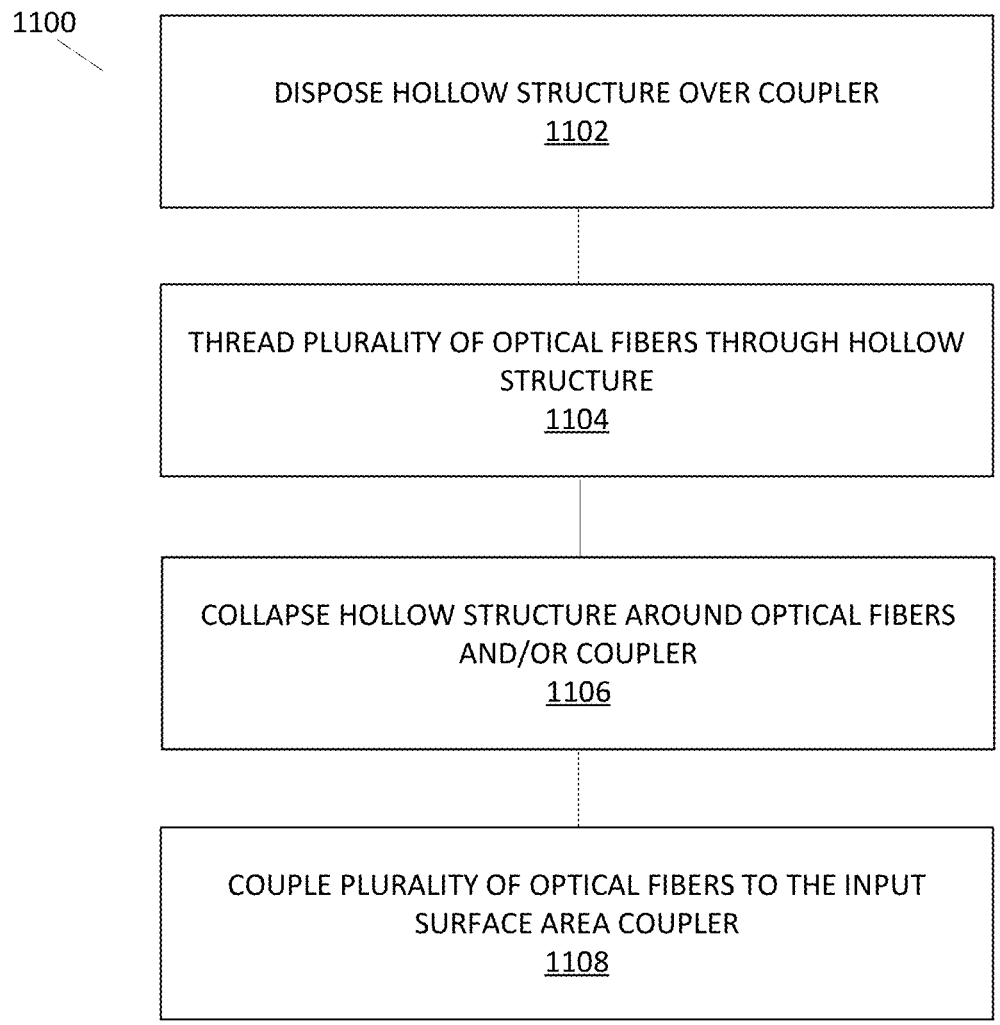
FIG. 11 illustrates an example process for fabricating an optical fiber combiner.

FIG. 11 illustrates an example process 1100 for assembling an optical fiber combiner 400. A hollow structure 210 may enable alignment of optical fibers 108 and coupler 102 during fabrication of optical combiner 400 and may secure optical fiber 108 and coupler in place as well as provide optical fibers 108 and/or coupler 102 protection from environmental contaminants or other hazards such as excess heat or percussion. Process 1100 may begin at block 1102, "DISPOSE HOLLOW STRUCTURE OVER COUPLER." At block 1102, hollow structure 210 may be loosely disposed over coupler 102 where an inner diameter 492 of central aperture 214 is greater than an outer diameter 490 of coupler 102 to enable fitting of hollow structure 210 around coupler 102 without significantly damaging coupler 102 or hollow structure 210.

Process 1100 may move to block 1104, "THREAD PLURALITY OF OPTICAL FIBERS THROUGH HOLLOW STRUCTURE." During assembly, bundle 112 of optical fibers 108 may be fed through central aperture 214 of hollow structure 210 for alignment with surface 106. Inner diameter 492 of hollow structure 210 at this point in the assembly of combiner 400 is greater than the diameter 494 of bundle 112 of optical fibers 108 to facilitate threading of optical fibers 108 through hollow structure 210. During assembly, having inner diameter 492 of hollow structure 210 greater than the diameter 494 of bundle 112 of optical fibers 108 may also facilitate alignment of surfaces 110 of optical fibers 108 with surface 106 of coupler 102.

Process 1100 proceeds to block 1006, "COLLAPSE HOLLOW STRUCTURE AROUND OPTICAL FIBERS AND/OR COUPLER." Hollow structure 210 may be collapsed over coupler and/or optical fibers by any known method such as by applying heat, mechanical pressure, vacuum suction, or the like or any combinations thereof. In an example, heat can be applied to hollow structure 210 to collapse it around coupler 102 and bundle 112. Heat may be applied by a variety of methods including using a $CO_2$ laser, plasma and/or resistive heating, or the like or any combinations thereof. Collapse may be executed before or after surfaces 110 are coupled with surface 106. In another embodiment, hollow structure 210 may be removed from assembly 400 after alignment and/or coupling of optical fibers 108 with surface 106 of coupler 102.

Process 1100 may move to block 1108, "COUPLE A PLURALITY OF OPTICAL FIBERS TO THE INPUT SURFACE AREA OF THE TAPERED SILICA ROD." One or more optical fibers 108 may be coupled to input surface 106 by a variety of methods, as discussed previously.

Although processes 900, 1000 and 1100 have been described as having several steps, it is not necessary for all of the steps of these processes to be performed nor is there a particular order in which the steps are to be practiced within the scope of the contemplated subject matter. Although processes 900, 1000, and 1100 above are described in the context of fabrication of combiner assembly 400, such description is for the sake of simplicity and is not intended to be limiting in any manner. Processes 900, 1000, and 1100 may be applied in fabrication of any example embodiments described, suggested or contemplated herein. Furthermore, unidentified intervening steps may be contemplated and practiced within the scope of the presently disclosed technology.

Figure 12B:
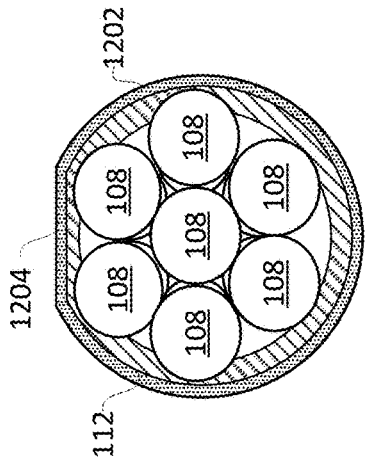
FIGS. 12A-12D depict examples of hollow structures having differing symmetries.
Figure 12D:
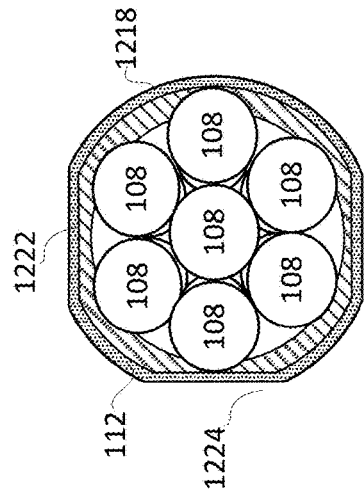
Figure 12A:
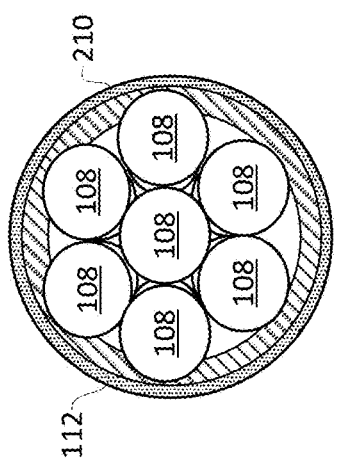
Figure 12:
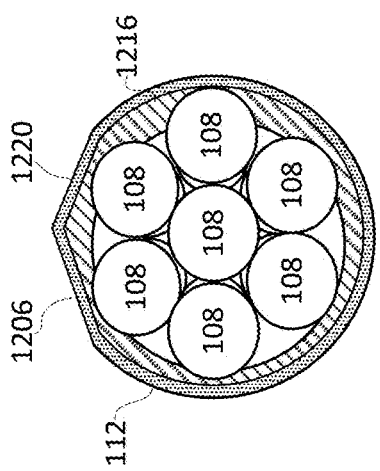
FIG. 12E depicts graphs of beam-parameter product (BPP) conversion efficiency for various hollow structure symmetries.
Figure 12E:
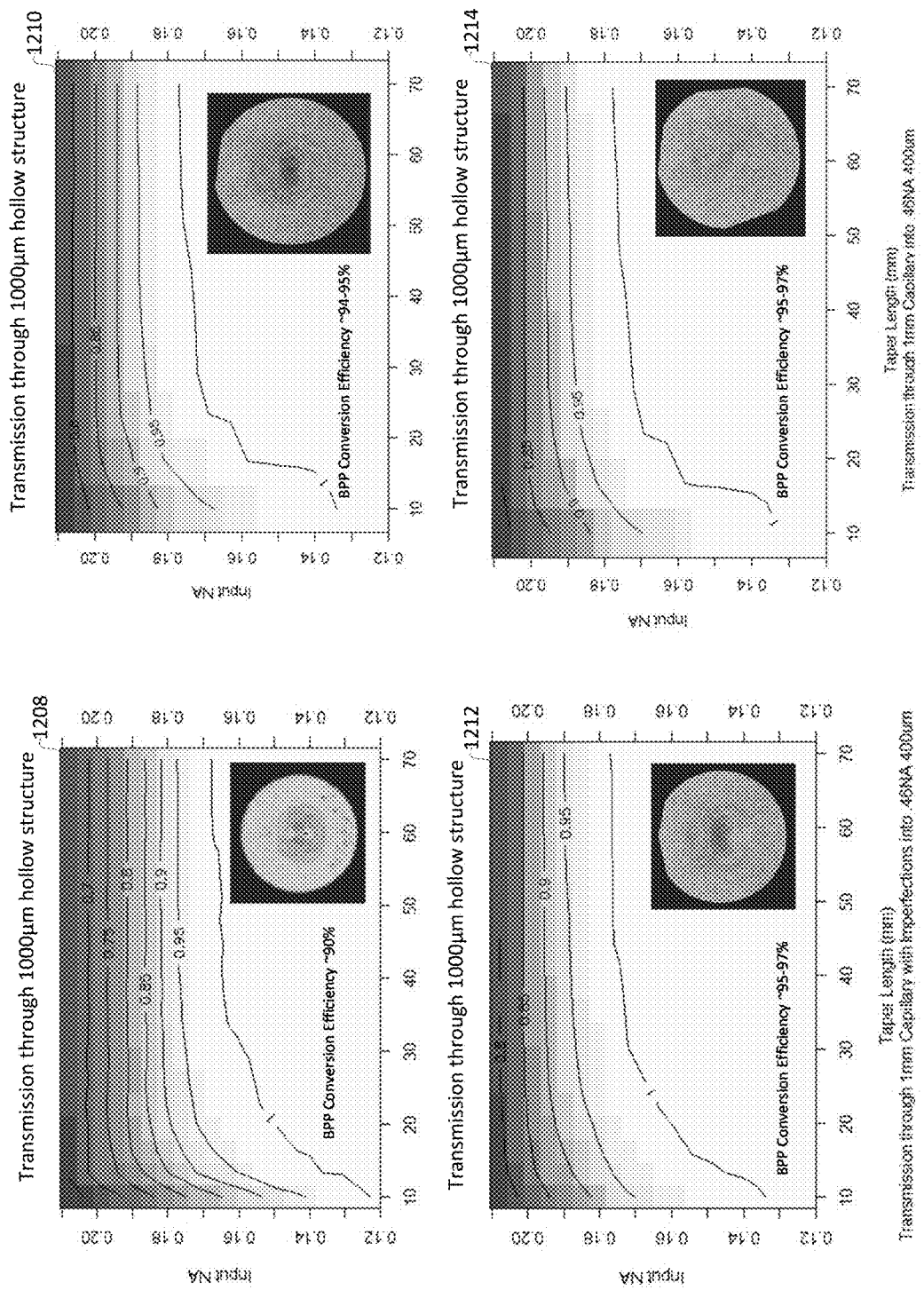

FIG. 12A-12D depict examples of hollow structures having differing symmetries. FIG. 12E depicts graphs of beam-parameter product (BPP) conversion efficiency for various hollow structure outer-surface symmetries. BPP conversion efficiency improves with increased asymmetry due in part to the fact that there is enhanced mode-scrambling or skew-rays bouncing over the length of the coupler in a non-circular outer-surface geometry. FIG. 12A is a sectional view of a bundle 112 of optical fibers 108 disposed in a symmetric hollow structure 210. As described above, hollow structure 210 may encase optical fibers 108 and facilitate coupling of optical fibers 108 to coupler 102. FIG. 12E depicts graphs of beam-parameter product (BPP) conversion efficiency for various hollow structure symmetries. Graph 1208 corresponding to a coupler assembly including hollow structure 210 depicted in FIG. 12A shows the BPP conversion efficiency to be ~90%.

FIG. 12B is a sectional view of a bundle 112 of optical fibers 108 disposed in an asymmetric hollow structure 1202. Hollow structure 1202 has one symmetry breaking feature 1204. Referring now to FIG. 12E, graph 1210 corresponding to a coupler including hollow structure 1202 in FIG. 12B shows the related BPP conversion efficiency to be ~94-95%.

FIG. 12C is a sectional view of a bundle 112 of optical fibers 108 disposed in an asymmetric hollow structure 1216. Hollow structure 1216 has two symmetry breaking features 1206 and 1220. Referring now to FIG. 12E, graph 1212 corresponding to a coupler including hollow structure 1216 in FIG. 12C shows the related BPP conversion efficiency to be ~95-97%.

FIG. 12D is a sectional view of a bundle 112 of optical fibers 108 disposed in an asymmetric hollow structure 1218. Hollow structure 1218 has three symmetry breaking features 1222, 1224 and 1226. Referring now to FIG. 12E, graph 1214 corresponding to a coupler including hollow structure 1218 in FIG. 12D shows the related BPP conversion efficiency to be ~95-97%.

Having described and illustrated the general and specific principles of examples of the presently disclosed technology, it should be apparent that the examples may be modified in arrangement and detail without departing from such principles. We claim all modifications and variation coming within the spirit and scope of the following claims.

The invention claimed is:

1. An optical fiber combiner comprising:
a coupling device having an input surface area, $A_{in}$, and an output surface area, $A_{out}$, wherein the input surface area $A_{in}$ is greater than the output surface area $A_{out}$ and wherein a body of the coupling device comprises a gradual taper from the input surface area to the output surface area;
a plurality of optical fibers each having an input surface and an output surface, wherein the output surfaces of the plurality of optical fibers are optically coupled to the coupling device, wherein the coupling device combines optical power emitted by the plurality of optical fibers; and
a hollow structure configured to encase the plurality of optical fibers and to secure the plurality of optical fibers in place for coupling to the coupling device wherein the hollow structure has a higher index of refraction compared to an index of refraction of input fiber cladding.

2. The optical fiber combiner of claim 1, wherein the hollow structure is a capillary having an inner diameter substantially equal to an outer diameter of the input surface area of the coupling device.

3. The optical fiber combiner of claim 2, wherein the hollow structure is closely-fit around the output surface area of the coupling device and the optical fibers.

4. The optical fiber combiner of claim 1, wherein the output surfaces of the plurality of optical fibers are substantially in contact with the input surface area of the coupling device.

5. The optical fiber combiner of claim 3, wherein there is a gap between the output surfaces of the plurality of optical fibers and the input surface area of the coupling device, wherein the plurality of optical fibers are held in place by the hollow structure.

6. The optical fiber combiner of claim 1, wherein the hollow structure has a shape substantially matching the shape of the input surface of the coupling device, wherein the shape is circular, elliptical, rectangular, polyhedral, or any combinations thereof.

7. The optical fiber combiner of claim 1, wherein the hollow structure comprises a material configured to constrict around the plurality of optical fibers and the coupling device in response to mechanical means, pressure change, exposure to a chemical, or a chemical catalyst, or any combinations thereof.

8. The optical fiber combiner of claim 1, wherein the output ends of the optical fibers are coated with an antireflective coating.

9. The optical fiber combiner of claim 1, wherein the output end of the optical fibers are coupled to the input surface of the coupling device by plasma heating, CO2 laser, resistive heating, fusion splicing or epoxy or any combinations thereof.

10. An optical fiber combiner comprising:
a coupling device having an input surface area, $A_{in}$, and an output surface area, $A_{out}$, wherein the input surface area $A_{in}$ is greater than the output surface area $A_{out}$ and wherein a body of the coupling device comprises a gradual taper from the input surface area to the output surface area;
a plurality of optical fibers each having an input surface and an output surface, wherein the output surfaces of the plurality of optical fibers are optically coupled to the coupling device, wherein the coupling device combines optical power emitted by the plurality of optical fibers; and
a hollow structure configured to encase the plurality of optical fibers and to secure the plurality of optical fibers in place for coupling to the coupling device wherein an outer surface of the hollow structure is textured to remove high numerical aperture light transmitted into the optical fibers or the hollow structure or a combination thereof.

11. An optical fiber combiner comprising:
a coupling device having an input surface area, $A_{in}$, and an output surface area, $A_{out}$, wherein the input surface area $A_{in}$ is greater than the output surface area $A_{out}$ and wherein a body of the coupling device comprises a gradual taper from the input surface area to the output surface area;
a plurality of optical fibers each having an input surface and an output surface, wherein the output surfaces of the plurality of optical fibers are optically coupled to the coupling device, wherein the coupling device combines optical power emitted by the plurality of optical fibers; and a hollow structure configured to encase the plurality of optical fibers and to secure the plurality of optical fibers in place for coupling to the coupling device wherein the hollow structure has an index of refraction that only strips light having a predetermined numerical aperture that is not desirable to be coupled into the coupling device.

12. An optical fiber combiner comprising:

a coupling device having an input surface area, $A_{in}$, and an output surface area, $A_{out}$, wherein the input surface area $A_{in}$ is greater than the output surface area $A_{out}$ and wherein a body of the coupling device comprises a gradual taper from the input surface area to the output surface area;

a plurality of optical fibers each having an input surface and an output surface, wherein the output surfaces of the plurality of optical fibers are optically coupled to the coupling device, wherein the coupling device combines optical power emitted by the plurality of optical fibers; and a hollow structure configured to encase the plurality of optical fibers and to secure the plurality of optical fibers in place for coupling to the coupling device wherein the hollow structure has an asymmetric shape and is configured to scramble one or more modes.

* * * * *